United States Patent [19]

Mizoguchi

[11] Patent Number: 5,095,328
[45] Date of Patent: Mar. 10, 1992

[54] IMAGE FORMING APPARATUS

[75] Inventor: Yoshito Mizoguchi, Yokohama, Japan

[73] Assignee: Canon Kabushiki Kaisha, Tokyo, Japan

[21] Appl. No.: 574,066

[22] Filed: Aug. 29, 1990

[30] Foreign Application Priority Data

Aug. 31, 1989 [JP] Japan .................. 1-225365

[51] Int. Cl.⁵ .............................. G03B 27/72
[52] U.S. Cl. ....................... 355/68; 355/77; 358/80
[58] Field of Search ........... 355/38, 68, 77; 358/75, 358/80, 283, 284

[56] References Cited

U.S. PATENT DOCUMENTS

4,786,976 11/1988 Takao et al. .......... 358/298 X
4,926,251 5/1990 Sekizawa et al. ....... 358/80 X
4,931,984 6/1990 Ny ..................... 364/900

Primary Examiner—L. T. Hix
Assistant Examiner—D. Rutledge
Attorney, Agent, or Firm—Fitzpatrick, Cella, Harper & Scinto

[57] ABSTRACT

The present invention provides an image forming apparatus for reproducing an image from an original, wherein a character portion and an intermediate contrast portion of an original are discriminated and different density converting tables are used for the character portion and for the intermediate contrast portion. When a original includes both a character portion and the intermediate contrast portion, the density converting table for a character portion is applied to the character portions and the density converting table for intermediate contrast portion is applied to the intermediate contrast portions to form the image.

13 Claims, 11 Drawing Sheets

| TREAT-MENT | FEATURE OF ORIGINAL | CHARACTER PORTION / PHOTOGRAPH PORTION | REPRODUCTION CHARACTER REQUIRE | DENSITY CONVERSION IN EMBODIMENT |
|---|---|---|---|---|
| S73 | IMAGE OF RELATIVELY LARGE CONTRAST | CHARACTER | 1. REMOVE FOG OF ORIGINAL BACKGROUND COMPLETELY<br>2. EMPHASIZE CHARACTER | WS WSt BSt BS |
| S74 | | PHOTOGRAPH | 1. REMOVE FOG OF ORIGINAL BACKGROUND COMPLETELY<br>2. REPRODUCE WHILE RETAINING DENSITY-LIGHT OF PHOTOGRAPH | WS WSt BS BSt |
| S75 | IMAGE OF SMALL CONTRAST | CHARACTER | 1. REMOVE FOG OF ORIGINAL BACKGROUND COMPLETELY<br>2. DO NOT EMPHASIZE LIGHT CHARACTER EXCESSIVELY | WS WSt BS BSt |
| S76 | | PHOTOGRAPH | 1. REMOVE FOG OF ORIGINAL BACKGROUND COMPLETELY<br>2. DO NOT EMPHASIZE DIFFERENCE OF DENSITY-LIGHT EXCESSIVELY | WS WSt BS BSt |

DENSITY CONVERTING TABLE DATA FOR CHARACTER

| ADDRESS | 0 | 1 | 2 | 3 | ... | 18 | 19 | 20 | 21 | 22 | 23 | 24 | 25 | ... | 248 | 249 | 250 | 251 | 252 | 253 | 254 | 255 | n |
|---|---|---|---|---|---|---|---|---|---|---|---|---|---|---|---|---|---|---|---|---|---|---|---|
| | 0 | 0 | 0 | 0 | --- | 0 | 0 | 0 | 0 | 1 | 2 | 4 | 6 | --- | 255 | 255 | | | | | | 255 | $T_t(n)$ |

↑ WSt    ↑ BSt

FIG.9B

DENSITY CONVERTING TABLE DATA FOR PHOTOGRAPH

| 0 | 0 | 0 | 0 | --- | 0 | 0 | 0 | 1 | 2 | 3 | 4 | 6 | --- | 253 | 254 | 255 | 255 | 255 | 255 | $T_p(n)$ |
|---|---|---|---|---|---|---|---|---|---|---|---|---|---|---|---|---|---|---|---|---|

↑ WSp    ↑ BSp

IMAGE FORMING APPARATUS

BACKGROUND OF THE INVENTION

1. Field of the Invention

The present invention relates to an image forming apparatus such as an electrophotographic copying machine, facsimile, printer and the like, and more particularly, it relates to an image forming apparatus for reproducing an original having an image including a character portion and an intermediate contrast portion such as a photograph, picture and the like.

2. Related Background Art

Conventionally, in a technical field wherein a multi-gradient image is read and a corresponding signal is outputted, an image forming apparatus having an automatic density converting function such that the density of an image is detected and the density of an output image is controlled on the basis of the detected density value, has been proposed.

However, if a original to be read includes an image having, for example, both a character portion and a photograph portion, simple density conversion results in improper density output. That is to say, with respect to the image of the original including both the character portion and the photograph portion, when the same or similar density conversion is effected regarding the character portion and the photograph portion, even if the reproduction of intermediate contrast of the photograph portion is important, such photograph portion is subjected to the large or heavy density conversion, with the result that the gradient of contrast is deteriorated, thus making optimal reproduction of the image having the intermediate contrast impossible. This problem can be solved by discriminating the character portion from the photograph portion by using an editor (editing apparatus) having the function for designating the image areas on the original with the image forming apparatus. However, in this case, there arise problems that the manipulation of the editor is troublesome and that the apparatus becomes expensive due to the addition of the editor.

SUMMARY OF THE INVENTION

An object of the present invention is to obtain a faithful reproduction image from an original image including both a character portion and an intermediate contrast portion such as a photograph.

Another object of the present invention is to automatically obtain a sharp image while retaining density-light of an original even if an image of the original has a different density distribution, by performing the density conversion required to reproduce the character with respect to a character portion and by performing the density conversion required to reproduce the photograph with respect to a photograph portion on the basis of the data obtained from the automatic discrimination between the character portion and the photograph portion.

In order to achieve the above object, the present invention provides an image forming apparatus for forming a reproduction image from an original, comprising an original density detecting means for detecting maximum density and minimum density of the original; a calculating means for obtaining density converting tables for intermediate contrast on the basis of the detection result regarding the maximum density and the minimum density from the detecting means; and a discriminating means for discriminating a character portion and an intermediate contrast portion of the original. When the original includes both the character portion and the intermediate contrast portion, the density converting table for character portions is applied to the character portion and the density converting table for intermediate contrast portions is applied to the intermediate contrast portion.

BRIEF DESCRIPTION OF THE DRAWINGS

FIG. 4, consisting of FIGS. 4A and 4B, a flow chart showing an image forming method in the present invention;

FIG. 9, consisting of FIGS. 9A and 9B, is a density converting table;

DETAILED DESCRIPTION OF THE PREFERRED EMBODIMENTS

Figure 2:
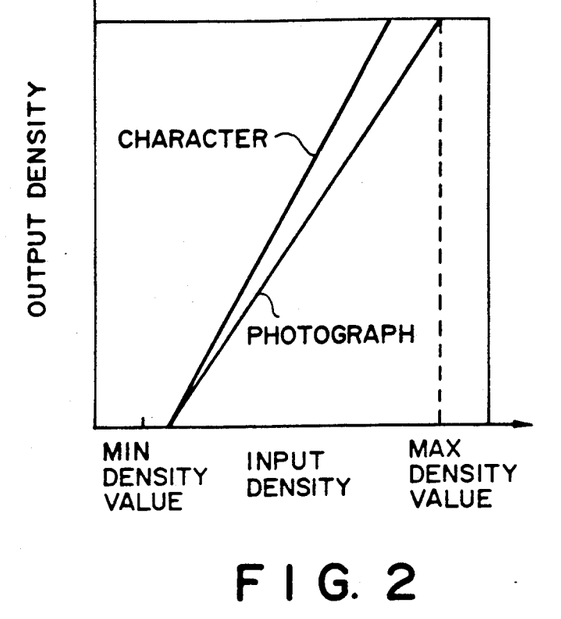
FIG. 2 is a graph showing a density converting curve regarding an image having a gradient in contrast.
Figure 3:
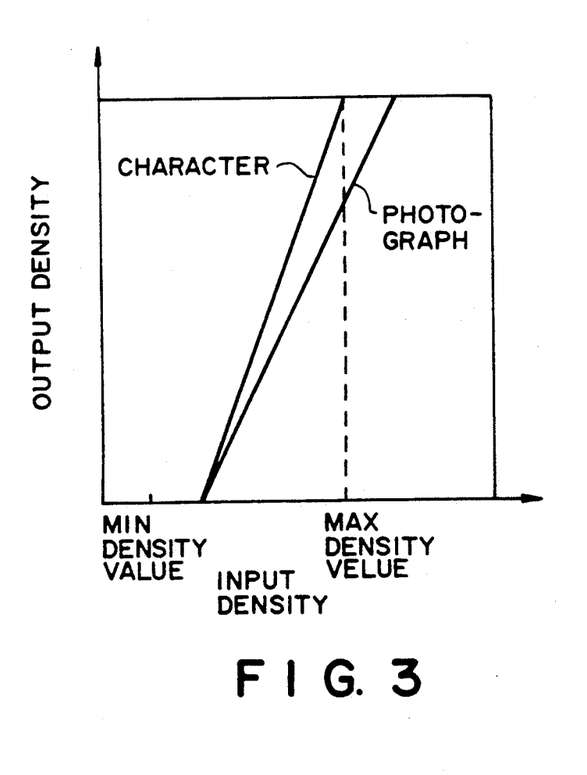
FIG. 3 is a graph showing a density converting curve regarding an image having no gradient in contrast.

The present invention is directed to obtain a sharp image having different density-light areas regarding a background portion, character portion and photograph portion of an original, by detecting the maximum density and the minimum density of the original and by performing the different density conversions regarding the character portion and the photograph portion, for example, as shown in FIG. 2.

Further, when the original has a light character portion or a photograph portion (for example, the original consists of a graph sheet), it is possible to remove the fog of the original background and to control the image quality so as not to make the character portion or the photograph portion excessively dense.

The present invention will now be explained with reference to a copying machine embodying the invention.

Figure 1:
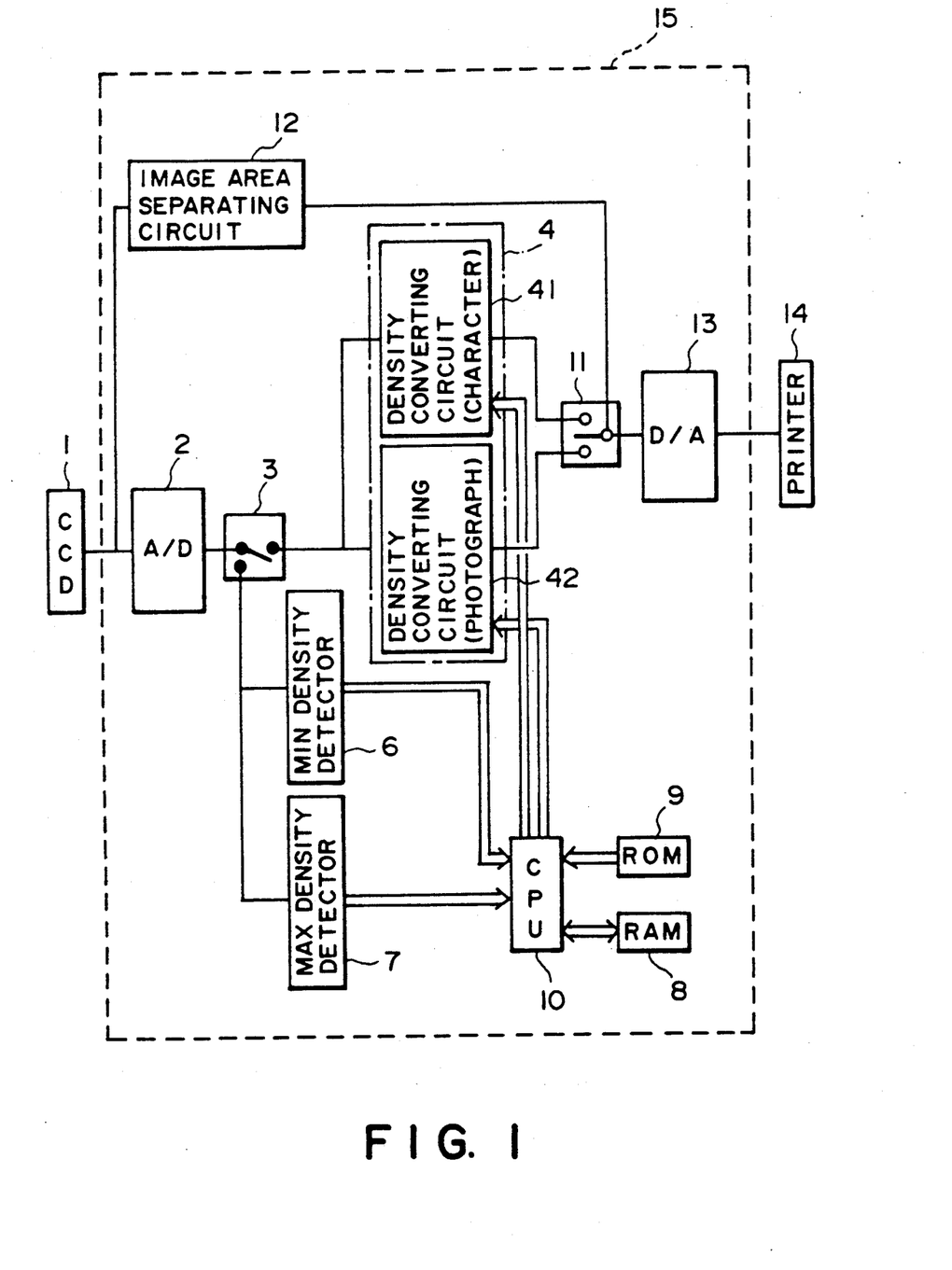
FIG. 1 is a block diagram showing an image forming apparatus according to the present invention.

FIG. 1 shows a block diagram of a copying machine according to an embodiment of the present invention. A processing portion shown by square broken line 15 performs the signal processing for the density conversion.

An original inputting portion 1 is constituted by a so-called CCD linear sensor which inputs the density of the original. An inputted analog signal is converted into a digital signal by means of an A/D converter 2. A bus switch 3 is controlled by a CPU (central processing unit) 10 to select whether the digital signal of the original is inputted to a density converting circuit 4 or whether the digital signal is inputted to a minimum density detector 6 and a maximum density detector 7. The minimum density detector 6 detects the minimum density of the density data included in one line in a main scanning direction of the CCD, and sends the detected result to the CPU 10. Similarly, the maximum density detector 7 detects the maximum of the density data included in one line, and sends the detected result to the CPU 10. Density converting circuits 41 and 42 perform the density converting operation on the basis of the density converting coefficient set by the CPU 10. The calculation of the density converting coefficient will be described later.

A read only memory (ROM) 9 stores the processing sequence for the CPU 10. Two kinds of density converting tables made by the CPU 10 are stored in a random access memory (RAM) 10. An image area separating circuit 12 is designed to discriminate whether a present pixel in question in one line read by the CPU 10 is a character pixel or a photograph pixel, and to send character/ photograph switching signal to a switch 11. On the basis of this character/photograph switching signal, the switch 11 connects the character density converting circuit 41 to a D/A converter 13 if the signal corresponds to the character signal, and connects the photograph density converting circuit 42 to the D/A converter 13 if the signal corresponds to the photograph signal. The D/A converter 13 converts the digital signal density-converted by the density converting circuit 41 or 42 into an analog signal. A printer 14 is an image outputting device having the expressing ability for density-light gradient and outputs an image signal converted by the processing portion 15.

Figures 4, 4B:
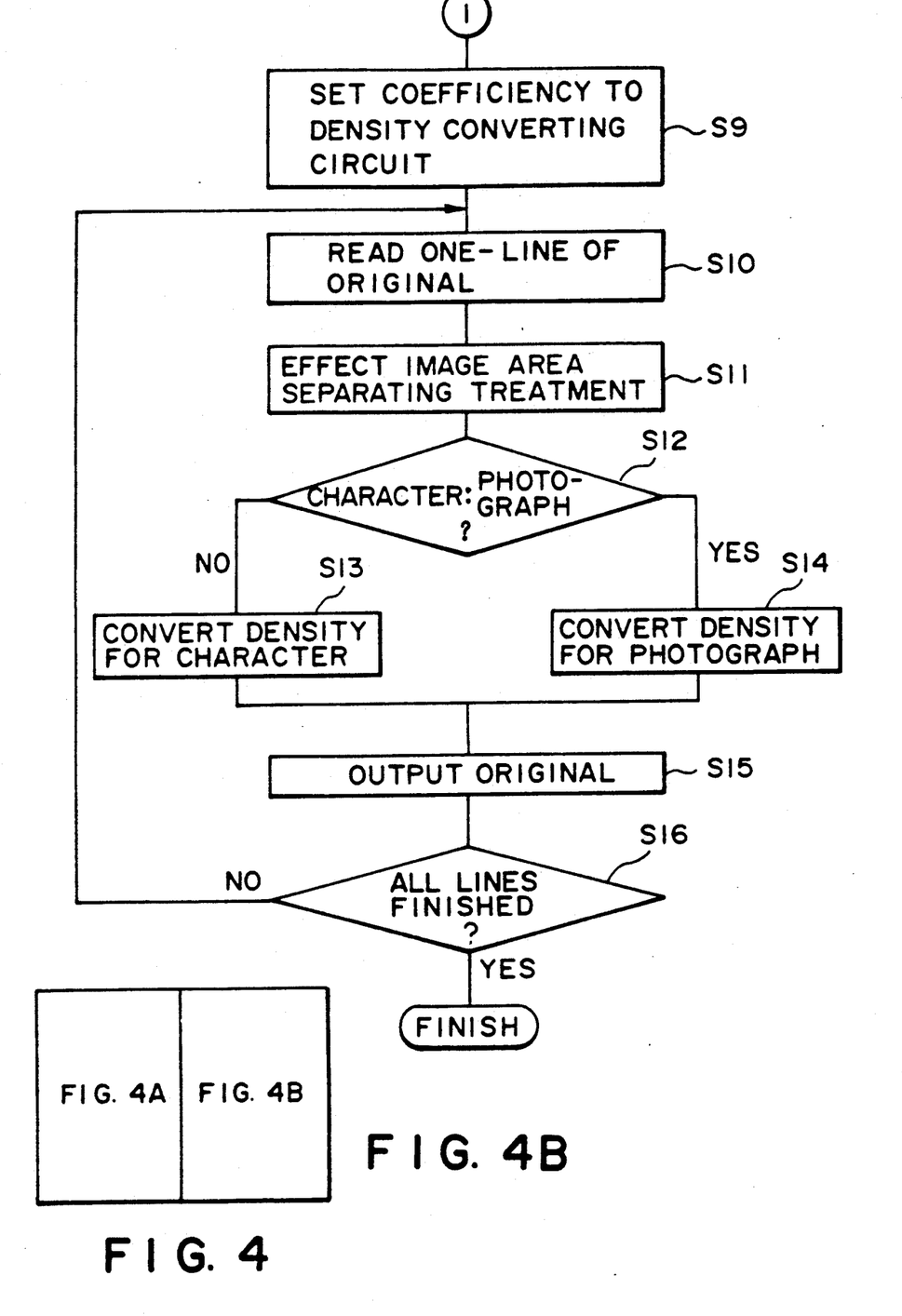
Figure 4A:
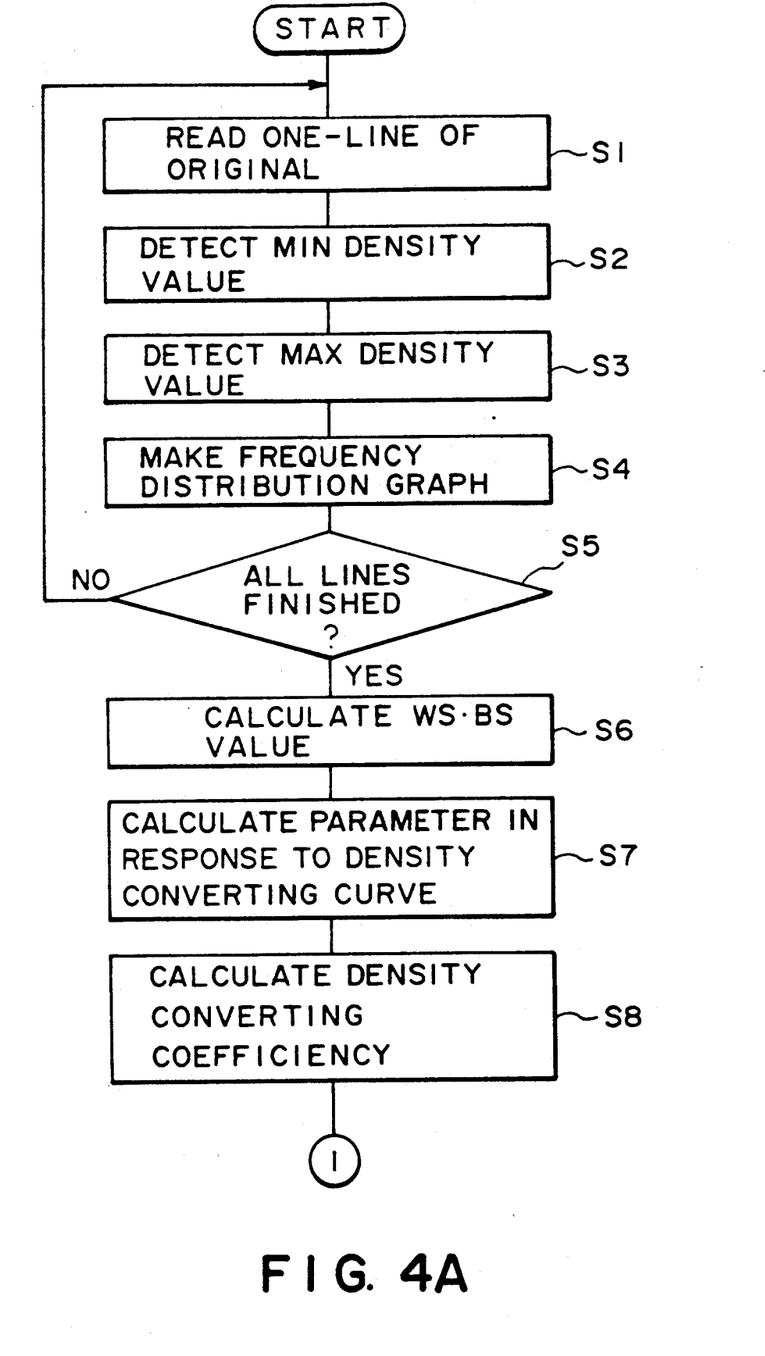

Now, a method for determining the density converting curve and a method for forming the image by the use of the density converting curve will be described in accordance with FIG. 4.

In a step S1, the density of the original in one line in the main scanning direction of the CCD from the original inputting portion 1 is read. In a step S2, the minimum density of one line is detected by the minimum density detector 6 and the detected result is sent to the CPU 10. In a step S3, the maximum density of one line is detected by the maximum density detector 7 and the detected result is sent to the CPU 10.

The above sequences are repeated until the density of all of the lines of the original is detected. Meanwhile, in a step S4, the CPU 10 makes or produces frequency distribution graphs (FIGS. 6 and 7) of the minimum density value and of the maximum density value sent from the steps S2 and S3, respectively.

Figure 6:
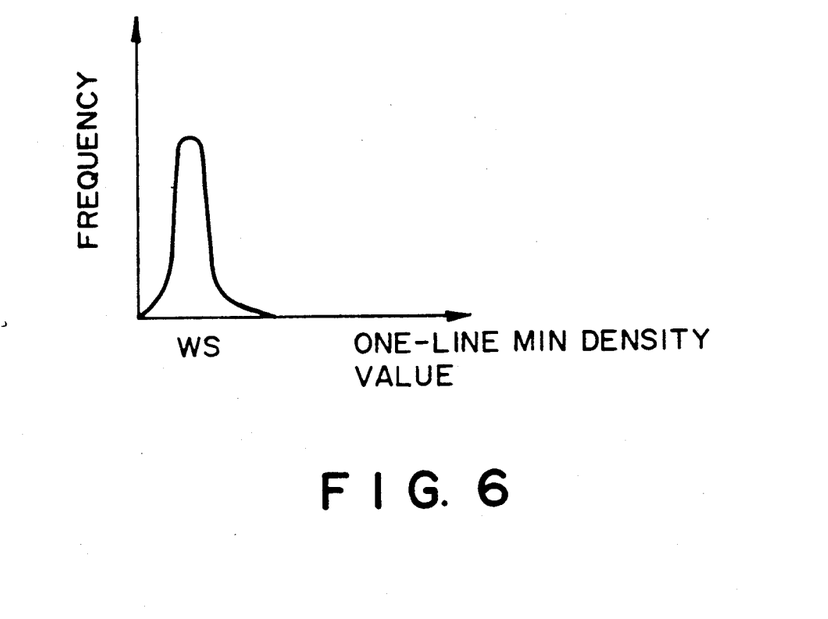
FIG. 6 is a graph showing a frequency distribution of the minimum density.
Figure 7:
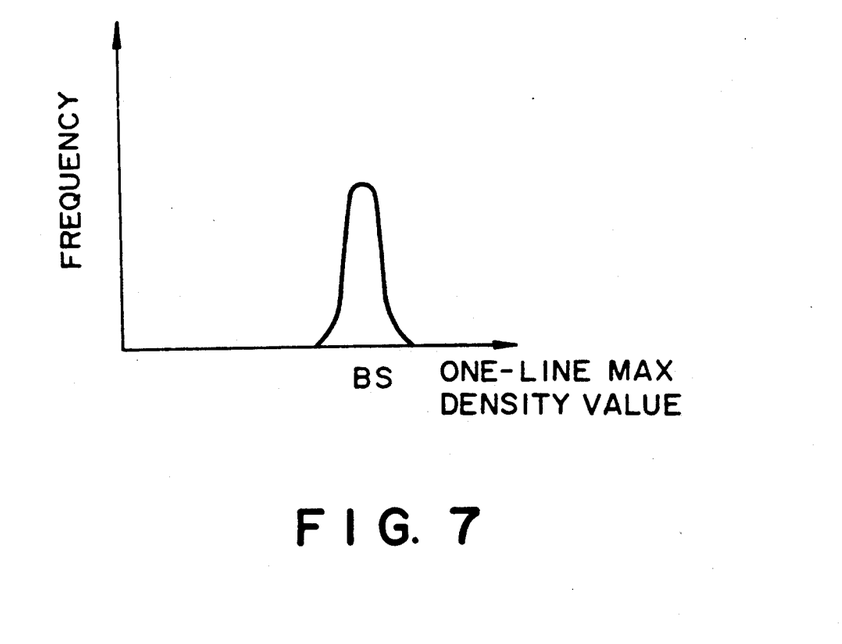
FIG. 7 is a graph showing a frequency distribution of the maximum density.

After all lines are finished (step S5), the CPU 10 calculates a minimum density reference value (WS) and a maximum density reference value (BS) from FIGS. 6 and 7 in a step S6. The minimum density reference value (WS) is obtained as a density value having the maximum frequency of the frequency distribution graph of FIG. 6 regarding the one-line minimum density value, and the maximum density reference value (BS) is obtained as a density value having the maximum frequency of the frequency distribution graph of FIG. 7 regarding the one-line maximum density value. In steps S7 and S8, the CPU 10 calculates the density converting coefficiency applied to the character portion and the density converting coefficiency applied to the photograph portion, respectively.

Figure 5:
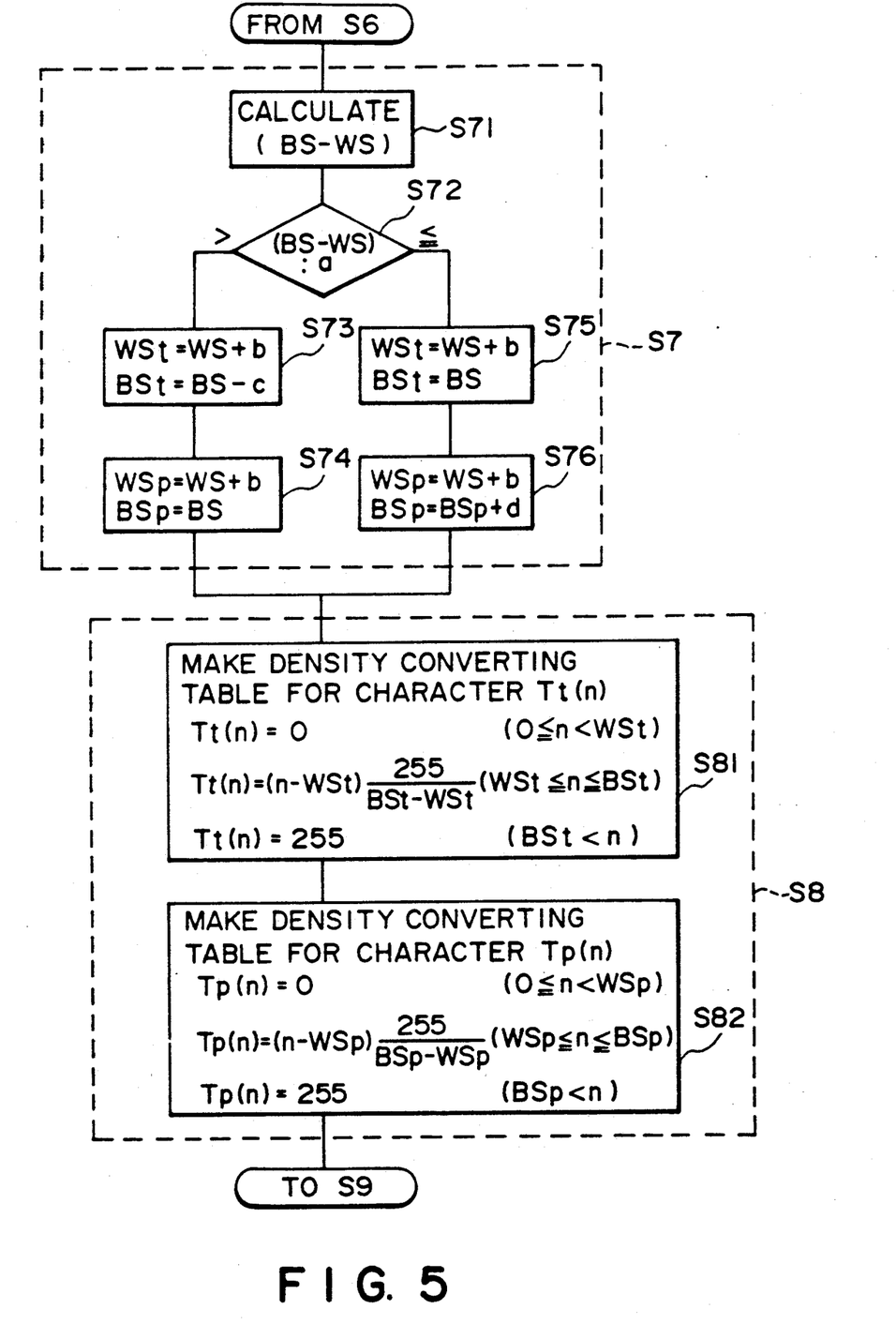
FIG. 5 is a flow chart showing the details of steps S7 and S8 in the flow chart of FIG. 4.

Now, the method for calculating the density converting coefficiency will be explained with reference to FIG. 5.

First of all, a value (BS−WS) is calculated in a step S71. In a step S72, if the value (BS−WS) is greater than a predetermined value a, steps S73 and S74 are executed, whereas, if the value is smaller than the predetermined value (i.e., if the difference in density between the original background and the character portion or the photograph portion is small), steps S75 and S76 are executed. The steps S73 or S75 respectively, uses the density converting curves for the character portion, and the step S74 or S76 supposes the density converting curve for the photograph portion.

Figure 8:
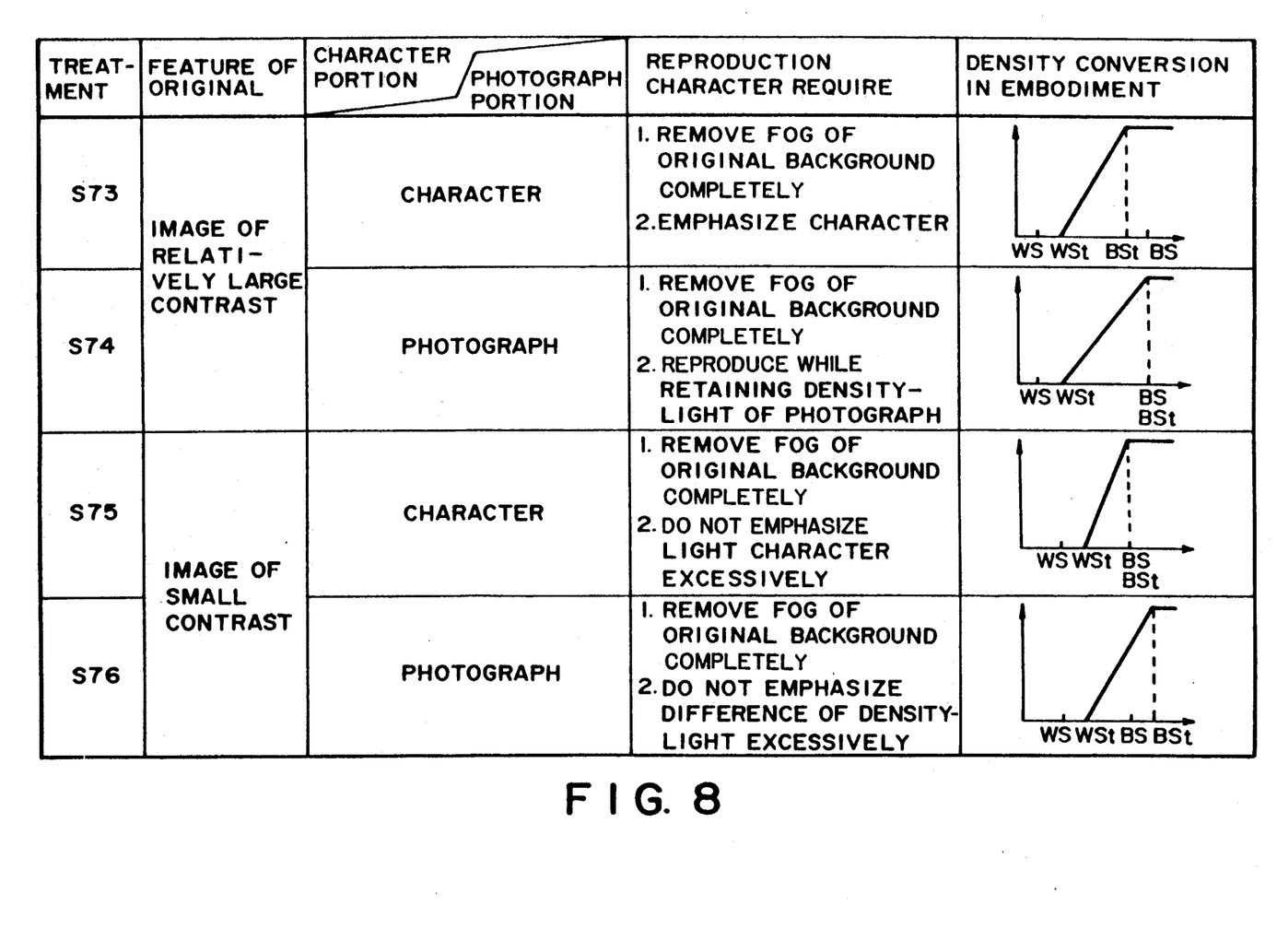
FIG. 8 is a table showing the contents of steps S3 to S7 in the flow chart of FIG. 5.

In the steps S73, S74, S75 and S76, the density converting curves are used in accordance with the features of the respective images. In FIG. 8, the feature of the image, the preferable reproduction character required according to such character, and the density converting curve used in this embodiment to carry out such reproduction are shown.

For example, regarding the step S73, since the value (BS−WS) is greater than the predetermined value (step S71) i.e., since the density converting curve in the character portion of the image of relatively large contrast is used, the reproduction character required is such that the fog of the original background is completely removed and the character is emphasized. Accordingly, as shown in FIG. 8, it is seen that the above requirement is met by selecting a value of the input density of (WS+b) as a minimum value of the output density and by selecting a value of the input density of (BS−c) as a maximum value of the output density and by supposing the density converting curve obtained by connecting between the minimum and maximum values with respect to the gradient between the minimum and maximum values.

Next, regarding the step S74, similar to the step S73, since the density converting curve in the photograph portion of the image of relatively large contrast is used, the reproduction character required is such that the fog of the original background is completely removed and the reproduction is effected with retaining the density-light of photograph. Accordingly, as shown in FIG. 8, it is seen that the above requirement is met by selecting a value of the input density of (WS+b) as a minimum value of the output density and by selecting a value of the input density of BS as a maximum value of the output density and by using the density converting curve obtained by connecting between the minimum and maximum values with respect to the gradient between the minimum and maximum values.

Next, regarding the step S75, since the value (BS−WS) is smaller than the predetermined value, i.e., since the density converting curve in the character portion of the image of small contrast is used, the reproduction character required is such that the fog of the original background is completely removed and the light character is not excessively emphasized. Accordingly, as shown in FIG. 8, it is seen that the above requirement is met by selecting a value of the input density of (WS+b) as a minimum value of the output density and by selecting a value of the input density of BS as a maximum value of the output density and by using the density converting curve obtained by connecting between the minimum and maximum values with respect to the gradient between the minimum and maximum values.

Next, regarding the step S76, similar to the step S75, since the density converting curve in the photograph portion of the image of small contrast is used, the reproduction character required is such that the fog of the original background is completely removed and the difference of density-light is not excessively emphasized. Accordingly, as shown in FIG. 8, it is seen that the above requirement is met by selecting a value of the input density of (WS+b) as a minimum value of the output density and by selecting a value of the input density of (BS+d) as a maximum value of the output density and by supposing the density converting curve obtained by connecting between the minimum and maximum values with respect to the gradient between the minimum and maximum values.

Here, by setting the predetermined value a compared by the value (BS−WS) in the step S71 as a=b+c+a constant, the inclination in the curves shown in FIG. 8 are prevented from reversing. Since the above-mentioned density converting curves can be expressed by the information of two points connected by the straight line, in the steps S73−S76, the variables WSt, BSt, WSp and BSp are calculated on the basis of FIG. 5, these variables being sent to steps S81 and S82 as parameters.

In the steps S81 and S82, the contents to be treated are the same, but the parameters used are different. In the step S81, the density converting table for characters is made by using the variables WSt and BSt, whereas, in the step S82, the density converting table for photographs is made by using the variables WSp and BSp.

Figure 9A:
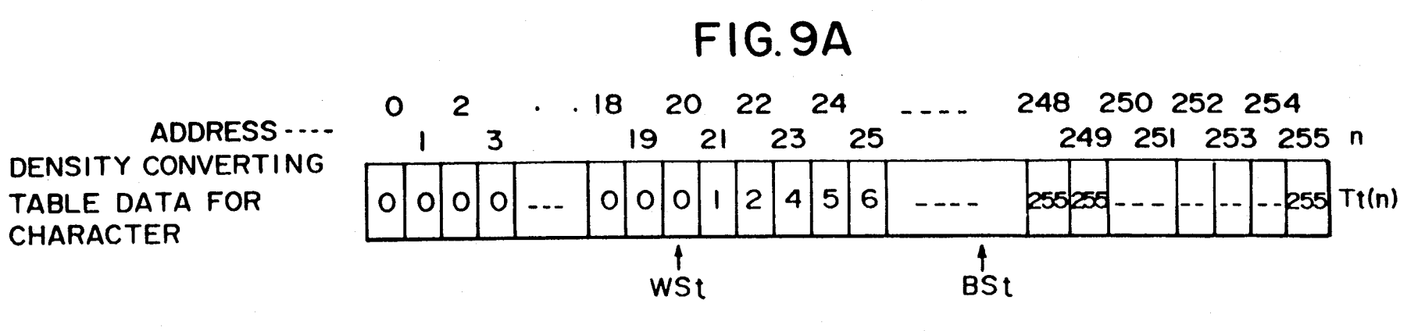
Figure 9B:
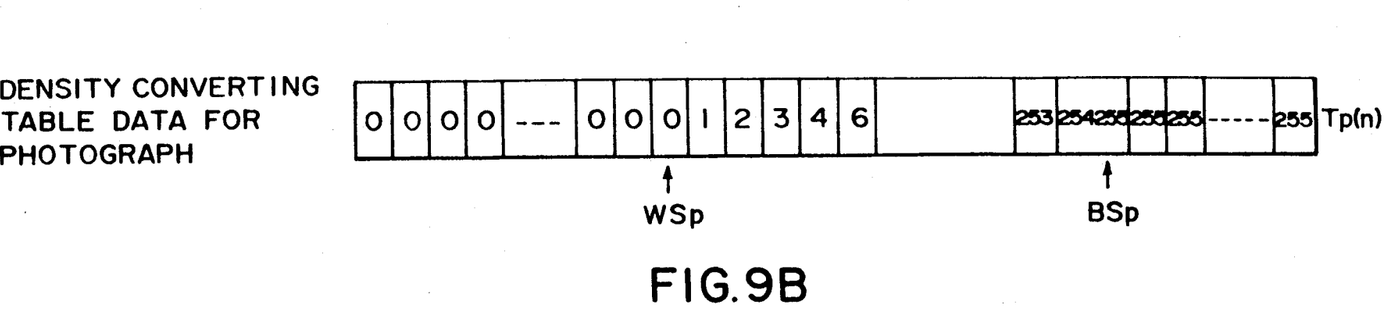

In the illustrated embodiment, as shown in FIG. 9, the density converting tables (T(n)) are constituted by density converting table data of 256 bits for characters and density converting table data of 256 bits for photographs, these tables being designated as Tt(n) and Tp(n), respectively. 0th address∼WSp address in the density converting table Tt(n), and 0th address∼WSp address in the density converting table Tp(n) are occupied by zero (0)., Whereas, (BSt+1) address∼255th address in the density converting table Tt(n), and (BSp+1) address∼255th address in the density converting table Tp(n) are occupied by 255. In the remaining intermediate addresses in the density converting tables, values obtained by linearly interpolating between 0 and 255 are set.

FIG. 9 shows the density converting table for character when WSt=20 and BSt=230, and the density converting table for photograph when WSp=20 and BSp=250. In this manner, the density converting tables are calculated by the CPU 8 and are stored in the RAM 10. Thereafter, in a step S9, the CPU 8 sets the density converting coefficiency for characters to the density converting circuit 41 and sets the density converting coefficiency for photographs to the density converting circuit 42.

Figure 10:
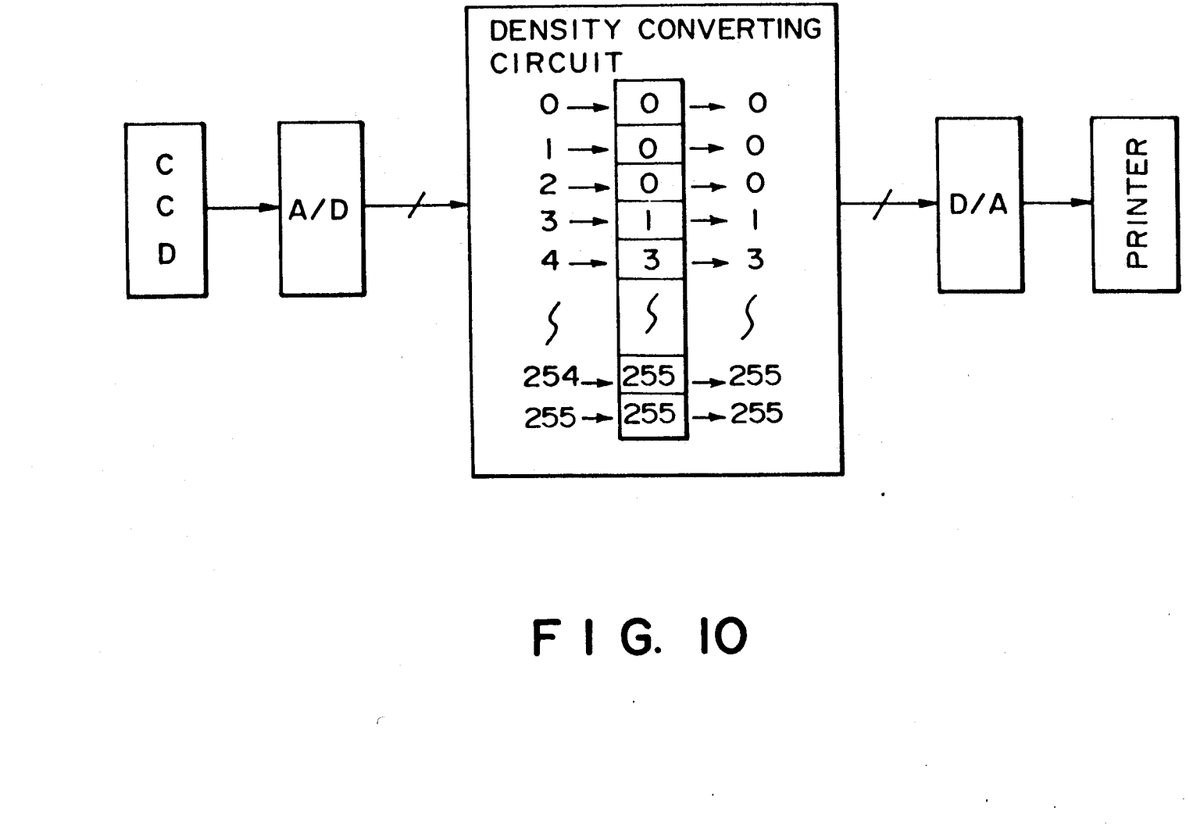
FIG. 10 is a view showing the density converting method.

The density converting circuits 41, 42 can convert the input density of 256 gradients into the output density of 256 gradients on the basis of the look-up table shown in FIG. 10.

Thereafter, the normal image formation is performed. In this case, the original is read line by line by the CCD in a step S10. In a step S11, an image area separating treatment for separating the character portion and the photograph portion in the image is effected. This is achieved by discriminating whether the present pixel in question is a character pixel or is a photograph pixel. Such discrimination can be performed by using the following method.

Figure 11:
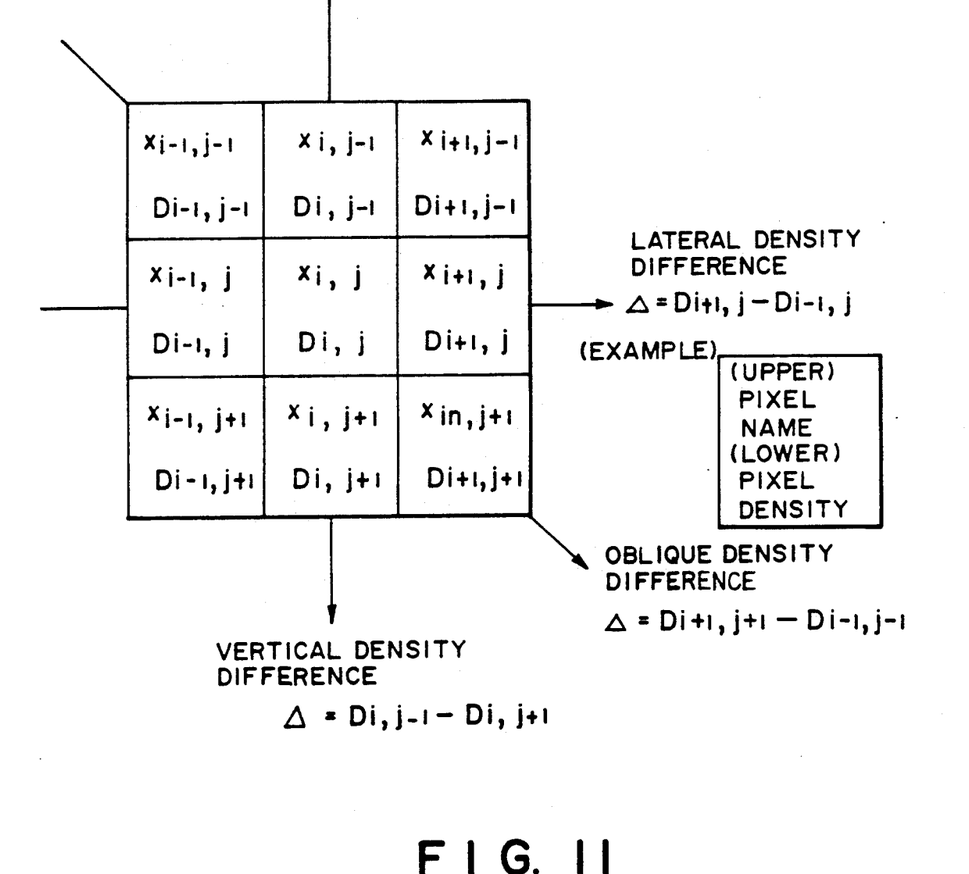
FIG. 11 is an explanatory view showing a character detecting method by separating an image area.

The image area separating circuit 12 has a plurality of buffers corresponding to few lines of CCD, where the data are stocked. By using such data, as shown in FIG. 11, vertical, lateral and oblique density differences (inclinations) of the present pixel in question are sought. If the inclinations are greater than a predetermined value, it is considered that such pixel is a vertical, lateral or oblique edge of a character. And, if the pixels are continuous in the vertical, lateral or oblique direction of the present pixel in question, it is assumed or considered that the pixel is a character pixel.

If a character pixel is determined in accordance with the above method, in a step S12, the sequence goes to a step S13. That is to say, the image area separating circuit 12 sends a signal to the switch 11 to connect the D/A converter 13 to the density converting circuit 41 for character. If it is not judged that the pixel is a character pixel, the sequence goes from the step S12 to a step S14. That is to say, the image area separating circuit 12 sends a signal to the switch 11 to connect the D/A conveter 13 to the density converting circuit 42 for photographs.

In this way, all of the pixels in one line are outputted in a step S15, and thereafter, the image formation is finished after all lines have been outputted in a step S16.

By outputting the image by using the above-mentioned image forming apparatus according to the present invention, regarding the original having both a character portion and a photograph portion, a good image wherein the character portion is emphasized and the dense-light contrast right of the photograph portion is moderately retained by the proper density conversion of the character and photograph portions can be obtained.

Next, a second embodiment of the present invention will be explained.

Figure 12:
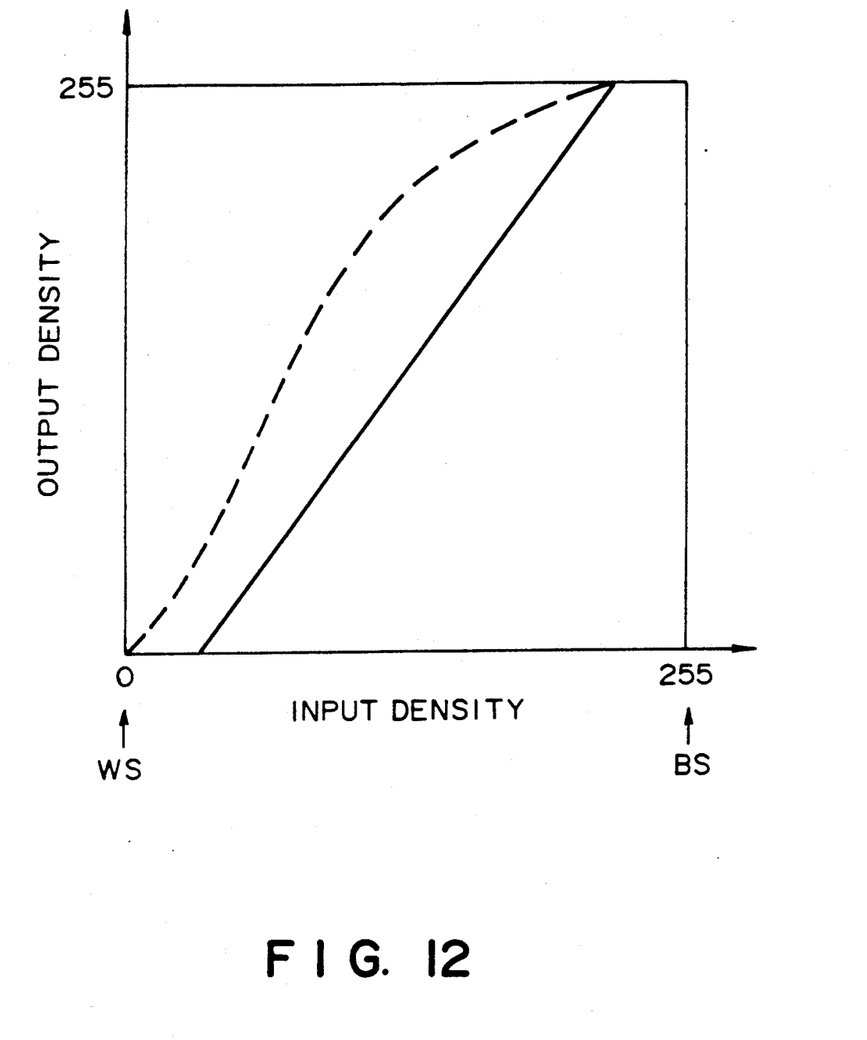
FIG. 12 is a graph showing a density converting curve according to another embodiment of the present invention.

In the above-mentioned first embodiment, if the character original has the characteristic of WS=0 and BS=255, the density converting curve for character becomes a solid line in FIG. 12, so that the character portion cannot be emphasized adequately. Even if such case occurs, such disadvantage is eliminated by selecting the density converting curve for characters as a curve having an upward convex shown a broken line in FIG. 12 rather than the straight line as in the previous embodiment. However, in this case, in order to calculate the density converting coefficiency in the step S81, since two or more calculating equations must be used, the calculation becomes more complex.

As mentioned above, according to the present invention, the density conversion required to reproduce characters is effected regarding the character portions and density conversion required to reproduce the photograph is effected regarding photographs portions, by automatically discriminating the character and photograph portions. Thus, even if there are different density distributions in the original, a sharp image can be obtained while retaining the dense-light contrasts of the original without using any special devices.

I claim:

1. An image forming apparatus for reproducing an image from an original, comprising:
   an original density detecting means for detecting a maximum density and a minimum density of the original;
   a calculating means for making a density converting table for a character portion and a density converting table for an intermediate contrast portion of the original, on the basis of the maximum density and the minimum density detected by said original density detecting means, the density converting table for the character portion being one which does not densely reproduce characters detected as light characters; and a discriminating means for discriminating the character portion and the intermediate contrast portion of the original, wherein, when the original includes both the character portion and the intermediate contrast portion, said density converting table for the character portion is applied to the character portion and said density converting table for the intermediate contrast portion is applied to the intermediate contrast portion to form the image.

2. An image forming apparatus according to claim 1, wherein the intermediate contrast portion is a photograph portion.

3. An image forming apparatus according to claim 1, wherein said original density detecting means measures each one line of the original to determine the maximum and minimum values.

4. An image forming apparatus according to claim 3, wherein the maximum density from said original density detecting means is sought from a frequency distribution of maximum densities in respective lines of the original.

5. An image forming apparatus according to claim 3, wherein the minimum density from said original density detecting mans is sought from a frequency distribution of minimum densities in respective lines of the original.

6. An image forming apparatus according to claim 1, wherein said density converting table for the character portion has an output density greater than that of said density converting table for the intermediate contrast portion.

7. An image forming apparatus for reproducing an image from an original, comprising:

an original density detecting means for detecting a maximum density and a minimum density of the original per one line thereof by using a solid-state image pickup element;

a calculating means for making a density converting table for a character portion and a density converting table for an intermediate contrast portion, on the basis of the maximum density and the minimum density detected by said original density detecting means, the density converting table for the character portion being one which does not densely reproduce characters detected as light characters; and a discriminating means for discriminating the character portion and the intermediate contrast portion of the original, wherein, when the original includes both the character portion and the intermediate contrast portion, said density converting table for the character portion having output density greater than that of said density converting table for the intermediate contrast portion is applied to the character portion to form the image.

8. An image forming apparatus according to claim 7, wherein the intermediate contrast portion is a photograph portion.

9. An image forming apparatus according to claim 7, wherein the maximum density from said original density detecting means is sought from a frequency distribution of maximum densities in respective lines of the original.

10. An image forming apparatus according to claim 7, wherein the minimum density from said original density detecting means is sought from a frequency distribution of minimum densities in respective lines of the original.

11. An image forming apparatus according to claim 7, wherein discrimination of the character portion and the intermediate contrast portion of the original is judged by a change in density between adjacent pixels.

12. An image forming apparatus for reproducing an image from an original, comprising:

an original density detecting means for detecting a maximum density and minimum density of the original;

a calculating means for making a density converting table for a character portion and a density converting table for an intermediate contrast portion, on the basis of the maximum density and the minimum density detected by said original density detecting means, the density converting table for the character portion being one which does not densely reproduce characters detected as light characters; and a discriminating means for discriminating the character portion and the intermediate contrast portion of the original, wherein, if the original includes both the character portion and the intermediate contrast portion, when said density converting table for the character portion is applied to the character portion and said density converting table for the intermediate contrast portion is applied to the intermediate contrast portion, the density converting tables are further altered to form the image.

13. An image forming apparatus according to claim 12, wherein the further alteration of said density converting tables is calculated on the basis of coefficiency.

* * * * *

UNITED STATES PATENT AND TRADEMARK OFFICE
CERTIFICATE OF CORRECTION

PATENT NO. : 5,095,328

DATED : March 10, 1992

INVENTOR(S) : YOSHITO MIZOGUCHI

Page 1 of 2

It is certified that error appears in the above-identified patent and that said Letters Patent is hereby corrected as shown below:

On the title page,

IN [57] ABSTRACT

Line 9, "the" should read --a--.

COLUMN 1

Line 21, "a" should read --an--.
Line 37, "the" should read --a--.

COLUMN 2

Line 17, "a" should read --is a--.
Line 26, "S3" should read --S73--.
Line 27, "S7" should read --S77--.
Line 37, "invention;" should read --invention.--.

COLUMN 3

Line 18, "(RAM) 10." should read --(RAM) 8.--.

COLUMN 4

Line 11, "steps" should read --step--.
Line 13, "supposes" should read --, respectively, uses--.
Line 43, "with" should read --while--.

COLUMN 5

Line 18, "inclination" should read --inclinations--.
Line 39, "(0)., Whereas," should read --(0), whereas--.

UNITED STATES PATENT AND TRADEMARK OFFICE
CERTIFICATE OF CORRECTION

PATENT NO. : 5,095,328
DATED : March 10, 1992
INVENTOR(S) : YOSHITO MIZOGUCHI

It is certified that error appears in the above-identified patent and that said Letters Patent is hereby corrected as shown below:

COLUMN 5

Line 50, "CPU 8" should read --CPU 10--.
  Line 51, "10." should read --8.--.

COLUMN 6

Line 17, "character." should read --characters.--.
  Line 31, "right" should be deleted.
  Line 44, "shown" should read --shown in--.

COLUMN 7

Line 31, "mans" should read --means--.

COLUMN 8

Line 29, "and" should read --and a--.

Signed and Sealed this

Twenty-eighth Day of December, 1993

Attest:

BRUCE LEHMAN

*Attesting Officer*      *Commissioner of Patents and Trademarks*